(12) United States Patent
Sharma

(10) Patent No.: US 7,174,298 B2
(45) Date of Patent: Feb. 6, 2007

(54) METHOD AND APPARATUS TO IMPROVE ACCURACY OF MOBILE SPEECH-ENABLED SERVICES

(75) Inventor: Sangita R Sharma, Portland, OR (US)

(73) Assignee: Intel Corporation, Santa Clara, CA (US)

(*) Notice: Subject to any disclaimer, the term of this patent is extended or adjusted under 35 U.S.C. 154(b) by 830 days.

(21) Appl. No.: 10/178,126

(22) Filed: Jun. 24, 2002

(65) Prior Publication Data
US 2003/0236665 A1 Dec. 25, 2003

(51) Int. Cl.
*G10L 21/00* (2006.01)

(52) U.S. Cl. ............ 704/270.1; 704/235; 379/88.03; 379/406.06; 455/556.1

(58) Field of Classification Search ........... 704/231, 704/251, 260, 235, 275, 240, 256, 270.1, 704/243, 244, 258; 379/88.03, 406.06, 406.08; 455/564, 556.1
See application file for complete search history.

(56) References Cited

U.S. PATENT DOCUMENTS

| | | | |
|---|---|---|---|
| 5,897,616 A * | 4/1999 | Kanevsky et al. | 704/246 |
| 6,529,871 B1 * | 3/2003 | Kanevsky et al. | 704/246 |
| 6,615,172 B1 * | 9/2003 | Bennett et al. | 704/257 |
| 6,785,647 B2 * | 8/2004 | Hutchison | 704/231 |
| 6,895,257 B2 * | 5/2005 | Boman et al. | 455/556.1 |

* cited by examiner

*Primary Examiner*—Vijay B. Chawan
(74) *Attorney, Agent, or Firm*—Michael R. Barre

(57) ABSTRACT

A speech recognition system includes a user profile to store acoustic data and a corresponding text transcript. A speech recognition ("SR") server downloads the acoustic data and the corresponding text transcript that are stored in the user profile. A speech recognition engine is included to adapt an acoustic model based on the acoustic data.

22 Claims, 3 Drawing Sheets

Speech recognition system 100

METHOD AND APPARATUS TO IMPROVE ACCURACY OF MOBILE SPEECH-ENABLED SERVICES

BACKGROUND

1. Technical Field

An embodiment of the present invention generally relates to a speech recognition system. More particularly, an embodiment of the present invention relates to a speech recognition system that enables a user to access a plurality of speech recognition engines without requiring that the user train each speech recognition engine.

2. Discussion of the Related Art

Speech recognition technology enables a user to invoke a particular function(s) by providing verbal instructions. Accuracy of a speech recognition system depends on a number of factors. For instance, it is well-known that speaker-independent ("SI") speech recognition systems typically suffer from lower accuracy as compared to speaker-dependent ("SD") speech recognition systems that have been trained on speaker-specific data. Furthermore, speech recognition accuracy may be negatively affected by environmental factors—such as background noise, reverberation, or microphone performance.

Adaptation to the speaker characteristics and background environment may improve speech recognition accuracy. For example, acoustic model adaptation is a common approach used for desktop-based speech recognition engines to adapt SI acoustic models to a particular user's voice and to the background environment. However, all of the current engine providers require the user to explicitly train his/her acoustic models by reading a predetermined text of duration between five and twenty minutes to create a SD acoustic model. This is a time-consuming task and hence is not user friendly. Thus, a speech recognition system, having a speech recognition engine that does not require explicit training by the user, is needed.

Mobile applications that utilize speech recognition technology pose additional issues. For instance, in a mobile usage model, users will very likely need to access different kinds of speech-enabled services provided by one or more service providers. Because the speech recognition engines that a particular service provider uses in its applications may differ from those used by other service providers, the current adaptation method requires the user to train each new speech recognition engine that he/she encounters while accessing different services. Furthermore, a service provider needs to maintain all of its customers' user profiles, so that a user is not required to retrain the speech recognition engines every time he/she accesses that particular service. Hence, most speech recognition service providers use SI systems that use the same acoustic models to recognize any user's speech. Consequently, speech recognition service providers must generally either compromise in accuracy or provide limited voice access capability (e.g., command and control functionality, as opposed to natural language queries).

DETAILED DESCRIPTION

Reference in the specification to "one embodiment", "an embodiment", or "another embodiment" of the present invention means that a particular feature, structure or characteristic described in connection with the embodiment is included in at least one embodiment of the present invention. Thus, appearances of the phrase "in one embodiment" or "according to an embodiment" appearing in various places throughout the specification are not necessarily all referring to the same embodiment. Likewise, appearances of the phrase "in another embodiment" or "according to another embodiment" appearing in various places throughout the specification are not necessarily referring to different embodiments.

Figure 1:
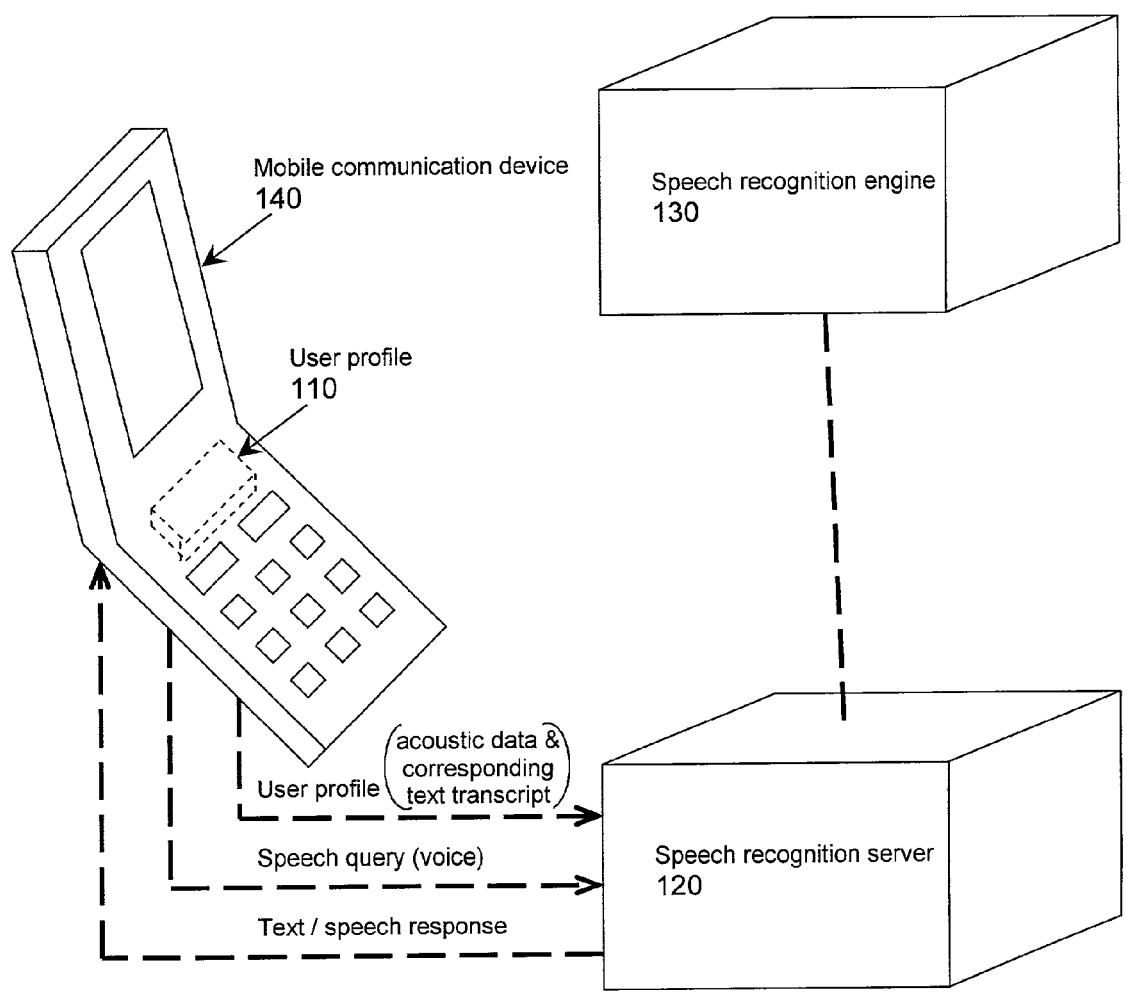
FIG. 1 illustrates a speech recognition system according to an embodiment of the present invention.

FIG. 1 illustrates a speech recognition system according to an embodiment of the present invention. The speech recognition system 100 includes a user profile 110, a speech recognition server 120, a speech recognition engine 130, and a mobile communication device 140. The user profile 110 includes acoustic data and a corresponding text transcript. The acoustic data may be a user's acoustic data. The speech recognition server 120 downloads the acoustic data and the corresponding text transcript that are stored in the user profile 110. The speech recognition engine 130 adapts an acoustic model (e.g., an SI acoustic model) based on the acoustic data. The speech recognition engine 130 may adapt the acoustic model based on the acoustic data and the corresponding text transcript.

According to an embodiment of the present invention, the user profile 110 may be stored within a mobile communication device 140. In an embodiment, the acoustic data may be a digitized sample of a user's voice. According to another embodiment, the speech recognition server 120 may record a background environment received from a mobile communication device 140. In yet another embodiment, the acoustic model may be user-independent.

A user may provide a speech query that is received by the speech recognition server 120. The speech recognition server 120 may provide a text/speech response, for example. An embodiment of the present invention may be an automated teller machine ("ATM") that allows the user to withdraw money from a bank account by using voice commands or a kiosk that allows the user to purchase movie tickets by using voice commands, for example.

Figure 2:
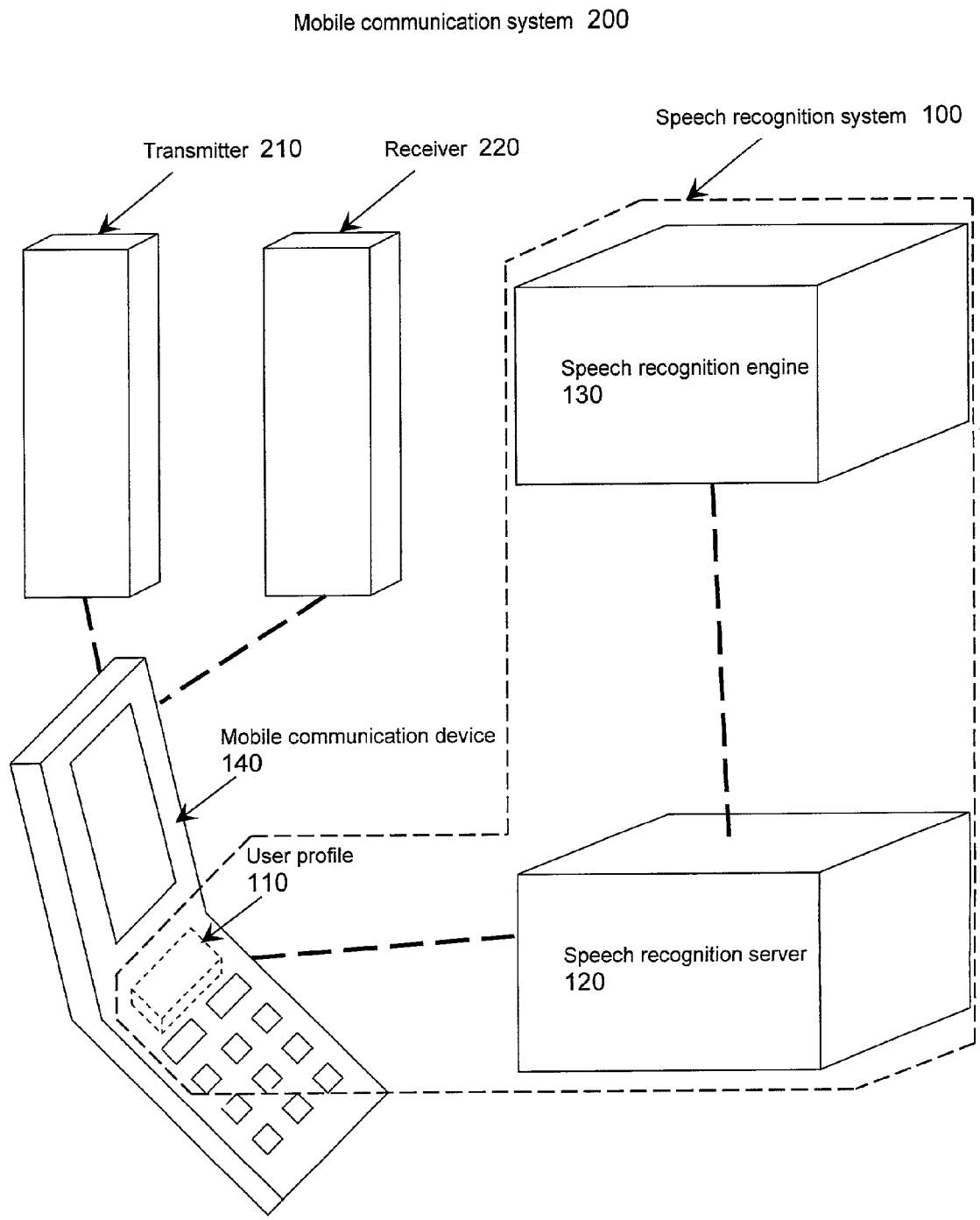
FIG. 2 illustrates a mobile communication system according to an embodiment of the present invention.

FIG. 2 illustrates a mobile communication system according to an embodiment of the present invention. The mobile communication system 200 includes a mobile communication device 140, a transmitter 210, a receiver 220, and a speech recognition system 100. The mobile communication device 140 stores a user profile 110. The transmitter 210 transmits a transmitting signal to the mobile communication device 140. The receiver 220 receives a receiving signal from the mobile communication device 140. The speech recognition system is described above, for example, with reference to FIG. 1.

According to an embodiment of the present invention, the transmitter 210 and the receiver 220 are within a single device.

A user may control lights within a residence by making voice commands through a cellular telephone, for example. Similarly, the user may purchase airline tickets by making voice commands through a cellular telephone.

Figure 3:
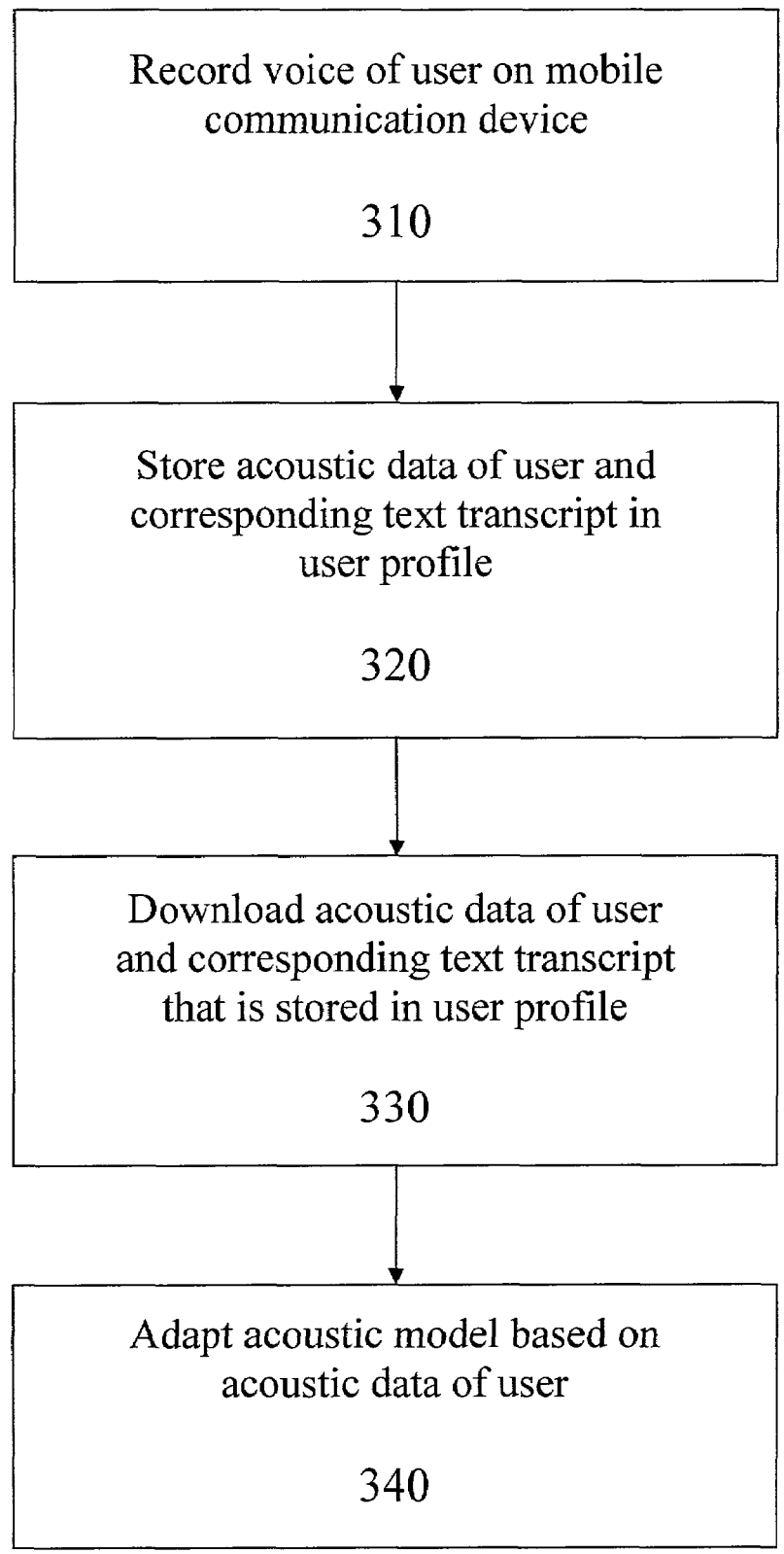
FIG. 3 illustrates a flow chart for a method of adapting an acoustic model to improve recognition accuracy according to an embodiment of the present invention.

FIG. 3 illustrates a flow chart for a method of adapting an acoustic model to improve recognition accuracy according to an embodiment of the present invention. Within the method and referring to FIGS. 1 and 3, a user's voice is recorded 310 on a mobile communication device 140. Acoustic data and a corresponding text transcript are stored 320 in a user profile 110. When a user comes in proximity of a network that has a speech recognition server 120 providing some speech-enabled service, for example, the speech recognition server 120 may automatically download 330 the acoustic data and the corresponding text transcript that are stored in the user profile 110. A speech recognition engine 130 may adapt 340 an acoustic model based on the acoustic data. The speech recognition engine 130 may adapt the acoustic model based on the acoustic data and the corresponding text transcript. The revised acoustic model may be used to process the user's subsequent voice queries.

According to an embodiment of the present invention, the acoustic data may be a digitized sample of the user's voice. In an embodiment, the speech recognition server 120 may record a background environment received from a mobile communication device 140. For example, if the speech recognition server 120 records the background environment, the speech recognition server 120 may combine the background environment and the acoustic data, and the speech recognition engine 130 may adapt the acoustic model based on the acoustic data and the background environment. The corresponding text transcript may be used to adapt the acoustic model based on the acoustic data and the background environment. The speech recognition engine 130 may simultaneously adapt the acoustic model to the user's voice and the background environment. According to an embodiment, the user profile 110 may be stored within the mobile communication device 140. In an embodiment, the acoustic model may be user-independent.

In short, the speech recognition system 100 according to an embodiment of the present invention improves accuracy of speech recognition functionality in mobile applications that allow a user to have voice-enabled access to arbitrary information through a mobile communication device 140. The speech recognition system 100 stores acoustic data, which may be a digitized sample of the user's voice, and the corresponding text transcript in a user profile 110, so that they may be downloaded automatically to a speech recognition server 120, for example. Therefore, an embodiment of the present invention eliminates the need for the user to explicitly train each separate speech recognition engine 130 within a service or services. Similarly, an embodiment of the present invention eliminates the need for a service provider to maintain all of its customers' user profiles. Thus, an embodiment of the present invention overcomes the training obstacle associated with typical SD systems, while avoiding the accuracy and voice access capability limitations that may be encountered with typical SI systems.

While the description above refers to particular embodiments of the present invention, it will be understood that many modifications may be made without departing from the spirit thereof. The accompanying claims are intended to cover such modifications as would fall within the true scope and spirit of an embodiment of the present invention. The presently disclosed embodiments are therefore to be considered in all respects as illustrative and not restrictive, the scope of an embodiment of the invention being indicated by the appended claims, rather than the foregoing description, and all changes that come within the meaning and range of equivalency of the claims are therefore intended to be embraced therein.

What is claimed is:

1. A speech recognition system, comprising:
   a mobile communication device;
   a user profile in the mobile communication device, the user profile to store acoustic data and a corresponding text transcript;
   a speech recognition ("SR") server to download the acoustic data and the corresponding text transcript that are stored in the user profile; and
   a speech recognition engine to adapt an acoustic model based on the acoustic data.

2. The speech recognition system according to claim 1, wherein the acoustic data is a digitized sample of a user's voice.

3. The speech recognition system according to claim 1, wherein the speech recognition server records a background environment received from a mobile communication device.

4. The speech recognition system according to claim 3, wherein the speech recognition server combines the background environment and the acoustic data, and the speech recognition engine adapts the acoustic model based on the acoustic data and the background environment.

5. The speech recognition system according to claim 1, wherein the acoustic model is user-independent.

6. A method of adapting an acoustic model to improve recognition accuracy, comprising:
   loading acoustic data and a corresponding text transcript from a communication device to a speech recognition (SR) server, the acoustic data obtained from speech by a person; and
   adapting an acoustic model for the SR server based at least in part on the acoustic data from the communication device.

7. The method according to claim 6, wherein the acoustic data comprises a digitized sample of the person's voice.

8. The method according to claim 6, further comprising:
   recording, at the SR server, a background environment received from the mobile communication device; and
   adapting the acoustic model, based at least in part on the acoustic data and the recorded background environment.

9. The method according to claim 6, further comprising:
   receiving the acoustic model from a user profile within the mobile communication device.

10. The method according to claim 6, wherein the acoustic model for the SR server comprises a user-independent acoustic model.

11. The method according to claim 6, further comprising:
    using the revised acoustic model to process subsequent voice queries from the person.

12. An article comprising:
    a storage medium having stored thereon instructions that when executed by a machine result in the following:
    loading acoustic data and a corresponding text transcript from a user profile in a communication device, and
    adapting an acoustic model for a speech recognition (SR) engine, based at least in part on the acoustic data.

13. The article according to claim 12, wherein the acoustic data is a digitized sample of the user's voice.

14. The article according to claim 12, wherein a SR server records a background environment received from the mobile communication device.

15. The article according to claim 14, wherein the SR server combines the background environment and the acoustic data, and the SR engine adapts the acoustic model based on the acoustic data and the background environment.

16. The article according to claim 12, wherein a SR server performs downloading the acoustic data and the corresponding text transcript.

17. The article according to claim 12, wherein a SR engine performs adapting the acoustic model based on the acoustic data.

18. The article according to claim 12, wherein the acoustic model is user-independent.

19. The article according to claim 12, wherein execution of the instructions further results in using a revised acoustic model to process subsequent voice queries of the user.

20. A processing system, comprising:
- a user profile to store user-dependent speech data for adapting a speech recognition model, the user-dependent speech data comprising a text transcript and corresponding acoustic data obtained from speech by a person;
- a transmitter to transmit the user-dependent speech data from the user profile in the processing system to a speech recognition ("SR") server, to allow the SR server to adapt a speaker-independent acoustic model into a revised acoustic model, based at least in part on the acoustic data from the user-dependent speech data; and
- the transmitter to transmit voice queries from the person to the SR server, to be translated into text using the revised acoustic model.

21. A processing system according to claim 20, wherein the processing system comprises a mobile communication device.

22. A processing system according to claim 20, wherein the acoustic data comprises a digitized sample of the person's voice.

* * * * *